UNITED STATES PATENT OFFICE.

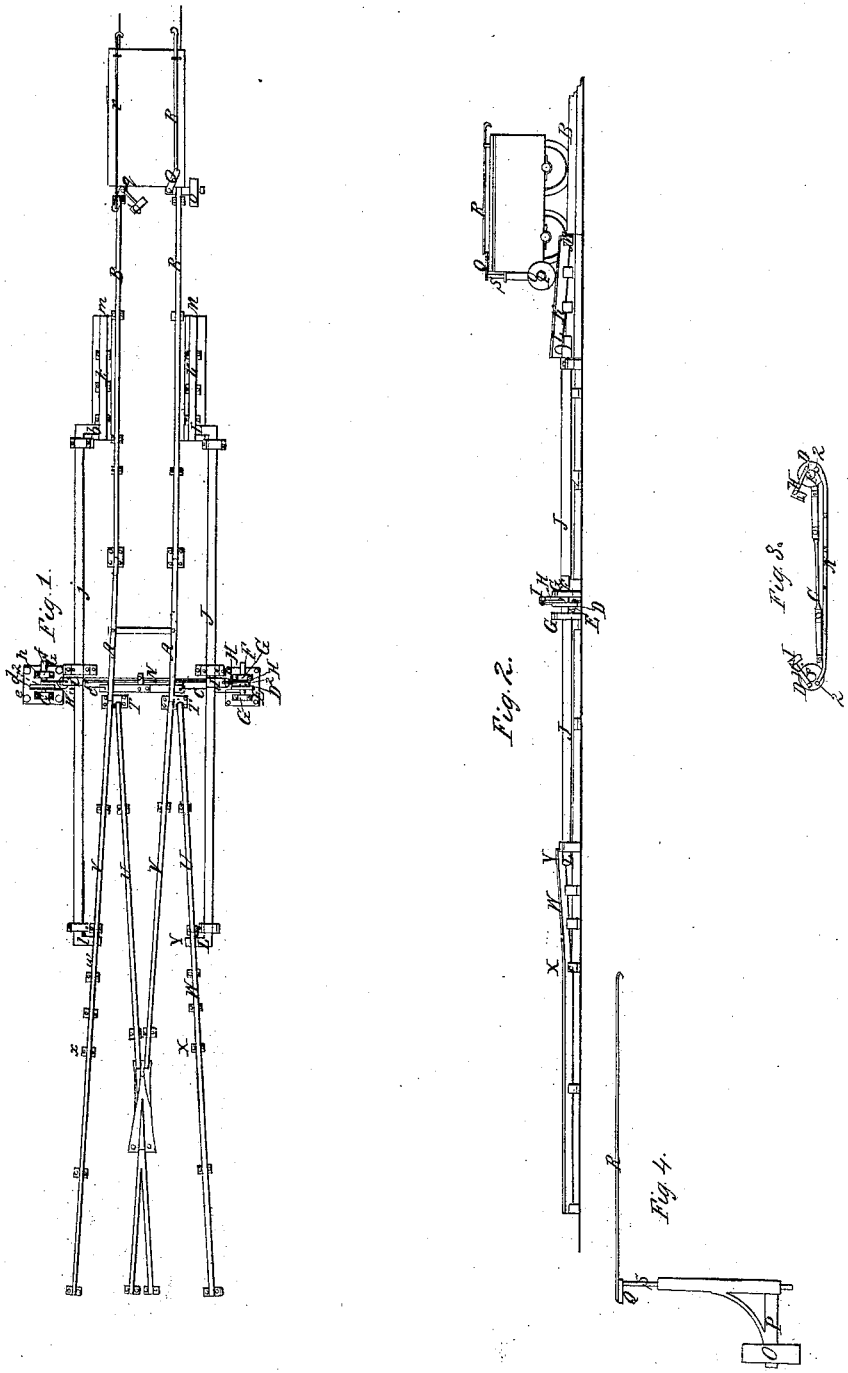

JNO. C. PAST, OF MORRISVILLE, PENNSYLVANIA.

SELF-ADJUSTING SWITCH FOR RAILROADS.

Specification of Letters Patent No. 1,294, dated August 21, 1839.

*To all whom it may concern:*

Be it known that I, JOHN C. PAST, of Morrisville, in the county of Bucks and State of Pennsylvania, have invented a new and useful Improvement in the Construction of Switches of Turnouts of Railways by which They can be Shifted by the Engineer on the Locomotive, which is described as follows, reference being had to the annexed drawings of the same, making part of this specification.

The nature of this invention and improvement consists in a certain combination and arrangement of connecting rods, cranks, wrists, crank shafts, and movable rails at the turnouts added to and combined with the ordinary switches and likewise certain additional wheels suspended to the locomotive by swivels, cranes or otherwise for depressing the movable rails at pleasure, for shifting said switches.

Figure 1 of the annexed drawings is a top view of a turn out, switch, and locomotive. Fig. 2 is a side view of ditto. Fig. 3 is a cross section. Fig. 4 is a vertical section of the swivel and wheel for depressing a side rail for shifting the switch.

Similar letters refer to similar parts in the figures.

The switch A, Figs. 1 and 2, is made in the usual manner; also the tracks B.—The rod C of the switch instead of being connected to the usual lever is attached to the side of a vibrating wheel D, by means of a wrist E—or to a vibrating crank—whose axle F moves in standards G. To the other side of said wheel D, near the circumference thereof, is attached another connecting rod H leading to an arm I projecting from a long vibrating crank shaft J, whose crank at one end is connected to the loose end of a movable rail K by a link L—which rail is placed on the outside of the track and moves vertically on a joint M at its other end in the manner of a treadle. On the other side of the switch is a similar connection of parts operated in like manner—these parts are marked with small letters.

A chain or jointed rod N extends from the lower side of one of the wheels passing under the switch to the lower side of the other wheel for the purpose of unlocking the switch. The switch is locked or held firmly in line with the track by so arranging the wrists E in the sides of the wheel to which the switch bars C are attached that they shall be in straight lines with the axles F of the wheels and form what is termed a dead center when the switch is in a line with the track. The switch A is locked or held firmly in the proper position or line with the track U by means of the connecting rod C whose wrist E is so arranged in the side of the wheel D that when the elevating or movable rail K is depressed said wrist will be in a straight line with the axle of the wheel D and the switch bars at the point where the rod C is united to them and thereby secures the switch firmly in its place or locks it.

In order to unlock the switch or change this dead center a wrist (2) is inserted in each wheel D below the axle E to which is attached the ends of the chain or jointed rod N as before mentioned. Wrist (2) is placed at an angle of about 35 degrees below or in advance of the wrist E, thus when either wheel is turned the other wheel turns with it by means of the connecting chain or rod N and thus changes the position of the wrists E and joints of the switch bar C from a straight line and destroys the dead center and thus unlocks the switch.

To the forward end of the locomotive near one side is attached, by means of a swivel S or other contrivance a revolving wheel O whose axle P is to be parallel with the track when the switch is not required to be changed, but is to be brought in the transverse position or at right angles to the track whenever the switch is to be changed by means of a crank Q on the upper end of the swivel S to which is attached a horizontal rod R to be pulled by the engineer, which will bring the wheel around upon the jointed or movable rail, which, as the locomotive advances will depress said rail and shift the switch. The engineer then pushes said rod from him which will return the wheel to its former position in front of the locomotive. A similar wheel and swivel is placed at the other corner of the locomotive in front operating in like manner to that just described. The frogs are made in the ordinary mode.

Now suppose the locomotive and train of cars to be moving on the track B, in the direction of the arrow, and it be desired to turn off at T and take the track U; just before the locomotive arrives at M the engineer must draw the rod R which will bring the wheel O around upon the falling or movable track K, and as the locomotive advances will depress the end L of said track—this will turn the long crank shaft J toward the switch—this turns the wheel in the same direction and draws the loose end of the switch in a contrary direction or toward said crank shaft until its ends are coincident or in a line with the rails, U, U, which will cause the locomotive to pass from the track B to the track U. And should the switch be in a line with the track U and it be desired to change it to the track V it will be only necessary to bring the wheel O around upon the movable track K and the object will be accomplished. The switch A may also be changed without the attention of the engineer, or any one, by making a section of one of the rails of the track at W movable on a hinge X and attaching said section by a link L or otherwise to an arm Y of the vibrating shaft J which will be turned as the locomotive passes on said hinged section of the rail and thus will cause the switch to be shifted. Track V is provided with a similar hinged section connected to the vibrating shaft, and operating in like manner.

The invention claimed and desired to be secured by Letters Patent is—

The before described mode of shifting switches of turnouts of railways by means of their combination with the crank shaft J and movable sections of rails K K to be acted upon by wheels on the locomotive to be governed by the engineer and the combination of the combined switches and crank shafts with the movable sections W of the rail track acted upon by the wheels of the locomotive:—Also the mode of locking and unlocking the switch by means of the arrangement of the wrists in the wheels and switch bars and chain attached to the same, all as before described.

JOHN C. PAST.

Witnesses:
ALBERT WHITE,
WILLIAM T. CARMIN.